United States Patent Office 3,631,080
Patented Dec. 28, 1971

3,631,080
QUATERNARY ALKYLATED ACIDS AND ESTERS
USEFUL FOR THE CONTROL OF INSECTS
John B. Siddall, Palo Alto, Calif., assignor to Zoecon
Corporation, Palo Alto, Calif.
No Drawing. Continuation-in-part of application Ser. No.
860,086, Sept. 22, 1969. This application Nov. 6, 1969,
Ser. No. 874,678
Int. Cl. A01n 9/24; C07c 69/52, 103/58
U.S. Cl. 260—410.9 R
7 Claims

ABSTRACT OF THE DISCLOSURE

Methods of employing and compositions comprising quaternary alkylated aliphatic acids, esters and amides for the control of insects.

This application is a continuation-in-part of my copending U.S. application Ser. No. 860,086 filed September 22, 1969, the entire disclosure of which is relied on.

This invention relates to methods and compositions for the control of insects. More particularly, the present invention relates to methods and compositions for the control of insects and novel quaternary alkylated aliphatic compounds of Formula A:

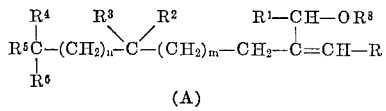

(A)

wherein, m is the positive integer one to five;
n is the positive integer two to six;
R is —COOR$^7$ or —CONR$^{10}$R$^{11}$;
R$^1$ is hydrogen or lower alkyl;
R$^2$ is hydrogen or lower alkyl;
Each of R$^3$, R$^4$, R$^5$ and R$^6$ is lower alkyl;
R$^7$ is hydrogen, lower alkyl, cycloalkyl, aralkyl or metal;
R$^8$ is hydrogen, tetrahydropyran-2'-yl or tetrahydrofuran-2'-yl; and
Each of R$^{10}$ and R$^{11}$ is hydrogen, alkyl, cycloalkyl, hydroxyalkyl, alkoxyalkyl, alkenyl, phenyl, or, when taken together with the nitrogen atom to which they are attached, pyrrolidino, morpholino, piperidino, piperazino or 4-alkylpiperazino.

The term "lower alkyl," as used herein, refers to a saturated aliphatic hydrocarbon group of a chain length of one to six carbon atoms, such as methyl, ethyl, n-propyl, n-pentyl, n-hexyl and 2-methylhexyl. The term "hydroxyalkyl," as used herein, refers to an alkyl group substituted with one hydroxy group, e.g. hydroxymethyl, p-hydroxyethyl and 4-hydroxypentyl. The term "alkoxyalkyl," as used herein, refers to an alkyl group substituted with one alkoxy group, e.g. methoxymethyl, 2-methoxyethyl, 4-ethoxybutyl, n-propoxyethyl and t-butoxyethyl. The term "alkenyl," as used herein, refers to an ethylenically unsaturated hydrocarbon group, branched or straight chain, having a chain length of two to twelve carbon atoms, e.g. allyl, vinyl, 3-butenyl, 2-butenyl, 2-hexenyl and i-propenyl. Whenever the foregoing terms are modified by the word "lower," the chain length of the group is not more than six carbon atoms with the exception of lower alkoxyalkyl in which a total chain length of twelve carbon atoms is the maximum.

The term "cycloalkyl," as used herein, refers to a cycloalkyl group of four to eight carbon atoms, e.g. cyclobutyl, cyclopentyl, cyclohexyl, cycloheptyl and cyclooctyl.

The term "aralkyl," as used herein, refers to an aralkyl group of seven to twelve carbon atoms, such as benzyl, phenylethyl, methylbenzyl and naphthylmethyl.

The term "metal," as used herein, refers to lithium, sodium, potassium, calcium, strontium, copper, manganese and zinc.

The present invention provides a novel method for the control of insects which comprises treating the insects with an effective amount of a compound of Formula A. To aid in achieving uniform and economical application, it is advantageous to employ a composition comprising an inert carrier and a compound of Formula A. These compositions can be either liquid or solid. The exact formulation employed will vary according to factors, such as specie of insect to be treated, the stage of the insect's life at time of treatment, the degree or extent of insect infestation, environmental conditions and type of application. The most advantageous formulation (composition) for the control of a specific insect is determinable by those of ordinary skill in the art by routine experimentation giving due consideration to the foregoing factors and the description herein.

The formulation employed is also dependent upon the primary mode or mechanism or treating the insects—that is, topical application (absorption), per oral application (ingestion), chemosterilant (sterility) or vaporization (inhalation). The primary role of treating insects, is, in turn, dependent or whether the insect is a chewing insect, a sucking insect or flying insect, whether the control of the insect is sought at the embryo, larvae, pupae or adult stage, and the locus of the insect.

Formulations can be prepared by incorporating a compound of Formula A with a solid inert carrier, such as finely divided talc, silica, pyrophyllite or clay or granular inert carriers, such as the vermiculites or a liquid inert carrier, such as acetone, xylene, peanut oil, cottonseed oil, sesame oil and other vegetable and mineral oils conventionally employed as carriers in formulations for insect control. Other components can be included, such as emulsifying agents, wetting agents and dispersing agents. Generally, the formulation will contain less than 95% by weight of the compound and more frequently less than 25%. Depending upon the particular insect being treated and the particular stage of the life cycle at the time of treatment, control of insects by treating the insects with a compound of Formula A is accomplished by the compound's ability to: inhibit metamorphosis; act as a direct insecticide, particularly at the embryo stage; act as a chemosterilant; or break the diapause of the insect.

Treatment of insects by vapor action can be accomplished for formulating a compound of Formula A with a resinous material, such as the vinyl polymers, e.g. polyvinyl chloride. This method is particularly useful for flying insects and treating enclosed areas. Suitable formulating methods and carriers are described in U.S. Pat. 3,318,-769, for example.

Although not intending to be limited by a theoretical explanation, it appears that the effectiveness of the compounds of Formula A can be traced to their ability to mimic the activity of juvenile hormone substances. Juvenile hormone was identified as methyl 10,11-oxide-7-ethyl-3,11 - trimethyltrideca - 2,6 - dienoate using an extract of cecropia moths by Roeller et al., Angew. Chem. internat. Edit. 6, 179 (1967) and Chemical and Engineering News, 48–49 (Apr. 10, 1967). A second juvenile hormone from the same source has been identified as methyl 10,11-oxide-3,7,11-trimethyltrideca-2,6-dienoate by Meyer et al., "The Two Juvenile Hormones from the Cecropia Silk Moth," Zoology (Proc. N.A.S.) 60, 853 (1968). In addition to the natural juvenile hormones, some synthetic terpenoids have been reported exhibiting maturation inhibiting, sterility or ovicidal activity. Bowers et al., Life Sciences (Oxford) 4, 2323 (1965); BioScience 18, No. 8, 791 (August, 1968); Williams, Scientific American 217, No. 1, 13 (July, 1967); Science 154, 248 (Oct. 14, 1966);

Romanuk et al., Proc. Nat. Acad. Sci. 57, 349 (1967); Masner et al., Nature 219, 395 (July 27, 1968); and U.S. Pats. 3,429,970 and 3,453,362.

Typical insects which can be controlled by treatment with a compound of Formula A in accordance with the present invention are *Dysdercus cingulatus, Tenebrio molitor, Galleria mellonella, Tribolium confusm, Periplaneta americana, Hypera puctata* (clover leaf weevil), *Dysdercus suturellus,* Aphididae, such as melon aphid and cabbage aphid, *Tinea pellionella, Sitophilus granarius, Lygus hesperus* and *Schistocerca vaga.*

The compounds of Formula A can be prepared according to the following outlined procedures.

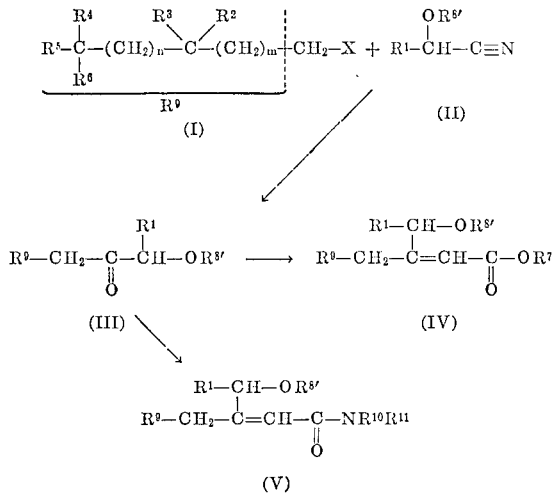

In the above formulas, $R^{8'}$ is an acid labile group such as tetrahydropyranyl or tetrahydrofuranyl, X is bromo or chloro and each of $R^1$, $R^2$, $R^3$, $R^4$, $R^5$, $R^6$, $R^7$, $R^{10}$, $R^{11}$, $m$ and $n$ is as defined hereinabove.

In the practice of the above process, the halide (I) is first converted into the corresponding Grignard in the usual manner by reaction with magnesium in an organic solvent such as ether, tetrahydrofuran, ether/hydrocarbon mixture, hexamethylphosphoramide, and the like, and then reacted with the nitrile (II) in an organic solvent inert to the reaction which can be accomplished by adding the nitrile (II) to the Grignard of I to yield the ketone (III). The reaction can be carried out at room temperature or higher such as at reflux. The ketone (III) is then reacted with a phosphonate (IV′) in the presence of base, such as an alkali metal hydride, to yield IV or with a phosphonamide (V′) in the presence of base, such as an alkali metal hydride, to yield V.

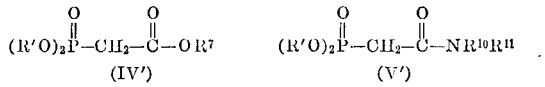

in which R′ is lower alkyl and each of $R^7$, $R^{10}$ and $R^{11}$ is as defined hereinabove.

The compounds IV and V, wherein $R^{8'}$ is tetrahydropyran-2′-yl or tetrahydrofuran-2′-yl, are treated with aqueous acid, such as dilute aqueous hydrochloric acid, sulfuric acid, and the like, to remove the acid labile group and thereby yield the corresponding free hydroxy-containing compound, i.e. compounds of Formula IV and V, wherein $R^{8'}$ is hydrogen.

The halides of Formula I are prepared according to the procedures described in my copending application Z–12 U.S. Ser. No. 854,778 filed Sept. 2, 1969, entitled "Insect Control," the disclosure of which is hereby incorporated by reference.

The nitriles of Formula II are prepared by the reaction of an aldehyde $R^1$—CHO with sodium cyanide in the presence of aqueous acid to yield $R^1$—CHOH—C≡N which is etherified in the usual manner to yield II.

The following examples set forth procedures for the preparation of the compounds of this invention and illustrate the present invention. Temperature in degrees centigrade.

EXAMPLE 1

(A) Two grams of 1-bromo-4-ethyl-4,7,7-trimethyloctane is added to 3 g. of magnesium in 25 ml. of ether. After the initial reaction, a solution of 24 g. of 1-bromo-4-ethyl-4,7,7-trimethyloctane in 100 ml. of ether is added while maintaining reflux.

The above-prepared Grignard reagent is cooled in an ice bath and 13 g. of 2-(tetrahydropyran-2′-yloxy)propionitrile is added slowly, under nitrogen, while maintaining reflux. The solution is then refluxed for one hour after completion of the addition, cooled, and a small amount of dilute aqueous sulfuric acid is added with swirling. The mixture is washed with water and the aqueous phase extracted with ether. The organic materials and ether extract are combined and washed with dilute aqueous hydrochloric acid until the washings are just acidic. The organic phase is dried over magnesium sulfate and evaporated under reduced pressure to give 2-(tetrahydropyran-2′-yloxy)-7-ethyl-7,10,10-trimethylundecan-3-one which can be purified by distillation or chromatography.

(B) To a mixture of 2.4 g. of sodium hydride in 100 ml. of tetrahydrofuran is added 22 g. of diethylcarbomethoxymethylphosphonate in 100 ml. of tetrahydrofuran under nitrogen. The mixture is stirred until the evolution of gas ceases and 30 g. of 2-(tetrahydropyran-2′-yloxy)-7-ethyl-7,10,10-trimethylundecan-3-one is then slowly added with stirring, maintaining the temperature below 30°. The mixture is stirred for about two hours and then diluted with water and extracted with ether. The ethereal extracts are washed well with water, dried over sodium sulfate and evaporated to remove the solvent to yield methyl 3 - [1 - (tetrahydropyran-2′-yloxy)ethyl]-7-ethyl-7,10,10-trimethylundec-2-enoate (IV; $R^1$ is methyl, $R^7$ is methyl, $R^{8'}$ is tetrahydropyranyl) which can be purified by distillation or chromatography.

(C) The ester (0.1 mole) of Part B dissolved in 100 ml. of aqueous tetrahydrofuran (1:4) is treated with aqueous 1 N hydrochloric acid (5 ml.) at 20° for three hours. After addition of aqueous potassium bicarbonate solution (0.5 g. in 300 ml. of water), the mixture is extracted with methylene chloride (3× 100 ml.). The combined extracts are washed with water (300 ml.), saturated aqueous potassium bicarbonate (50 ml.) and saturated brine (100 ml.), dried over magnesium sulfate and evaporated under reduced pressure to yield methyl 3-[1-(1-hydroxy)ethyl] - 7-ethyl-7,10,10-trimethylundec-2-enoate (IV; $R^1$ is methyl, $R^7$ is methyl, $R^{8'}$ is hydrogen) which can be purified by distillation in vacuo.

EXAMPLE 2

(A) To 2.4 g. of sodium hydride in 100 ml. of tetrahydrofuran, under nitrogen, is added slowly, diethoxyphosphonoacetamide (20 g.) in 100 ml. of tetrahydrofuran. After addition, the mixture is stirred for one hour at room temperature, then 30 g. of 2-(tetrahydropyran-2′-yloxy) - 7 - ethyl - 7,10,10 - trimethylundecan - 3 - one in tetrahydrofuran is slowly added, under nitrogen. After addition is complete, the mixture is stirred at room temperature overnight. The mixture is poured into water and extracted with methylene chloride. The extracts are washed with water, dried over magnesium sulfate and evaporated to yield 3-[1-(1-tetrahydropyran-2′-yloxy)ethyl] - 7-ethyl-7,10,10-trimethylundec-2-enamide which can be purified by chromatography or distillation.

(B) The amide of Part A is hydrolyzed using the procedure of Example 1 (Part C) to yield 3-[1-(1-hydroxy)-ethyl] - 7 - ethyl-7,10,10-trimethylundec-2-enamide (V; $R^1$ is methyl, $R^{8'}$ is hydrogen, $R^{20}$ is hydrogen, $R^{11}$ is hydrogen).

EXAMPLE 3

(A) The procedure of Example 1 (Part A) is repeated using each of 1-bromo-4,4,8,8-tetramethylnonane,
1-bromo-3,3,7,7-tetramethyloctane,
1-bromo-4,4,7,7-tetramethyloctane,
1-bromo-4,4,8,8-tetramethyldecane,
1-bromo-4,4,7,7-trimethyl-4-ethylnonane,
1-bromo-4,7-dimethyl-4,7-diethylnonane,
1-bromo-4,4,7,7-tetramethylnonane, and
1-bromo-4,4,9,9-tetramethyldecane as the starting material in place of 1-bromo-4-ethyl-4,7,7-trimethyloctane to yield the respective product listed under Column I.

(I)

2-(tetrahydropyran-2'-yloxy)-7,7,11,11-tetramethyl-dodecan-3-one,
2-(tetrahydropyran-2'-yloxy)-6,6,10,10-tetramethyl-undecan-3-one,
2-(tetrahydropyran-2'-yloxy)-7,7,10,10-tetramethyl-undecan-3-one,
2-(tetrahydropyran-2'-yloxy)-7,7,11,11-tetramethyl-tridecan-3-one,
2-(tetrahydropyran-2'-yloxy)-7-ethyl-7,10,10-trimethyl-dodecan-3-one,
2-(tetrahydropyran-2'-yloxy)-7,10-diethyl-7,10-dimethyldodecan-3-one,
2-(tetrahydropyran-2'-yloxy)-7,7,10,10-tetramethyl-dodecan-3-one,
2-(tetrahydropyran-2'-yloxy)-7,7,12,12-tetramethyl-tridecan-3-one.

(B) Each of the ketones listed under Column I is used as the starting material in the procedure of Example 1 (Part B) to yield the respective product listed under Column II.

(II)

methyl 3-[1-(1-tetrahydropyran-2'-yloxy)ethyl]-7,7,11,11-tetramethyldodec-2-enoate,
methyl 3-[1-(1-tetrahydropyran-2'-yloxy)ethyl]-6,6,10,10-tetramethylundec-2-enoate,
methyl 3-[1-(1-tetrahydropyran-2'-yloxy)ethyl]-7,7,10,10-tetramethylundec-2-enoate,
methyl 3-[1-(1-tetrahydropyran-2'-yloxy)ethyl]-7,7,11,11-tetramethyltridec-2-enoate,
methyl 3-[1-(1-tetrahydropyran-2'-yloxy)ethyl]-7-ethyl-7,10,10-trimethyldodec-2-enoate,
methyl 3-[1-(1-tetrahydropyran-2'-yloxy)ethyl]-7,10-diethyl-7,10-dimethyldodec-2-enoate,
methyl 3-[1-(1-tetrahydropyran-2'-yloxy)ethyl]-7,7,10,10-tetramethyldodec-2-enoate,
methyl 3-[1-(1-tetrahydropyran-2'-yloxy)ethyl]-7,7,12,12-tetramethyltridec-2-enoate.

(C) Each of the methyl esters under Column II is used in the process of Example 1 (Part C) to yield the respective final product listed under Column III.

(III)

methyl 3-[1-(1-hydroxy)ethyl]-7,7,11,11-tetramethyl-dodec-2-enoate,
methyl 3-[1-(1-hydroxy)ethyl]-6,6,10,10-tetramethyl-undec-2-enoate,
methyl 3-[1-(1-hydroxy)ethyl]-7,7,10,10-tetramethyl-undec-2-enoate,
methyl 3-[1-(1-hydroxy)ethyl]-7,7,11,11-tetramethyl-tridec-2-enoate,
methyl 3-[1-(1-hydroxy)ethyl]-7-ethyl-7,10,10-trimethyldodec-2-enoate,
methyl 3-[1-(1-hydroxy)ethyl]-7,10-diethyl-7,10-dimethyldodec-2-enoate,
methyl 3-[1-(1-hydroxy)ethyl]-7,7,10,10-tetramethyl-dodec-2-enoate,
methyl 3-[1-(1-hydroxy)ethyl]-7,7,12,12-tetramethyl-tridec-2-enoate.

EXAMPLE 4

(A) The process of Example 2 (Part A) is repeated using each of the ketones listed under Column I to yield the respective product listed under Column IV.

(IV)

3-[1-(1-tetrahydropyran-2'-yloxy)ethyl]-7,7,11,11-tetramethyldodec-2-enamide,
3-[1-(1-tetrahydropyran-2'-yloxy)ethyl]-6,6,10,10-tetramethylundec-2-enamide,
3-[1-(1-tetrahydropyran-2'-yloxy)ethyl]-7,7,10,10-tetramethylundec-2-enamide,
3-[1-(1-tetrahydropyran-2'-yloxy)ethyl]-7,7,11,11-tetramethyltridec-2-enamide,
3-[1-(1-tetrahydropyran-2'-yloxy)ethyl]-7-ethyl-7,10,10-trimethyldodec-2-enamide,
3-[1-(1-tetrahydropyran-2'-yloxy)ethyl]-7,10-diethyl-7,10-dimethyldodec-2-enamide,
3-[1-(1-tetrahydropyran-2'-yloxy)ethyl]-7,7,10,10-tetramethyldodec-2-enamide,
3-[1-(1-tetrahydropyran-2'-yloxy)ethyl]-7,7,12,12-tetramethyltridec-2-enamide.

(B) Each of the amides under Column IV is used in the process of Example 1 (Part C) to yield the respective final product listed under Column V.

(V)

3-[1-(1-hydroxy)ethyl]-7,7,11,11-tetramethyldodec-2-enamide,
3-[1-(1-hydroxy)ethyl]-6,6,10,10-tetramethylundec-2-enamide,
3-[1-(1-hydroxy)ethyl]-7,7,10,10-tetramethylundec-2-enamide,
3-[1-(1-hydroxy)ethyl]-7,7,11,11-tetramethyltridec-2-enamide,
3-[1-(1-hydroxy)ethyl]-7-ethyl-7,10,10-trimethyldodec-2-enamide,
3-[1-(1-hydroxy)ethyl]-7,10-diethyl-7,10-dimethyldodec-2-enamide,
3-[1-(1-hydroxy)ethyl]-7,7,10,10-tetramethyldodec-2-enamide,
3-[1-(1-hydroxy)ethyl]-7,7,12,12-tetramethyltridec-2-enamide.

EXAMPLE 5

(A) By repeating the process of Example 1 (Part A) using the halides listed under Column VI, the respective ketones listed under Column VII are obtained.

(VI)

1-bromo-5,5,10,10-tetramethylundecane,
1-bromo-4,7,7-trimethyloctane,
1-bromo-4,8,8-trimethylnonane,
1-bromo-4,7,7-trimethylnonane,
1-bromo-4-ethyl-7,7-dimethylnonane,
1-bromo-4,8,8-trimethyldecane,
1-bromo-2,6,6-trimethylheptane, (VII)

2-(tetrahydropyran-2'-yloxy)-8,8,13,13-tetramethyl-tetradecan-3-one,
2-(tetrahydropyran-2'-yloxy)-7,10,10-trimethylundecan-3-one,
2-(tetrahydropyran-2'-yloxy)-7,11,11-trimethyldodecan-3-one,
2-(tetrahydropyran-2'-yloxy)-7,10,10-trimethyldodecan-3-one,
2-(tetrahydropyran-2'-yloxy)-7-ethyl-10,10-dimethyldodecan-3-one,
2-(tetrahydropyran-2'-yloxy)-7,11,11-trimethyltridecan-3-one,
2-(tetrahydropyran-2'-yloxy)-5,9,9-trimethyldecan-3-one.

The ketones listed under Column VII are treated according to the procedure of Example 1 (Part B) to yield the methyl esters under Column VIII which are hydrolyzed using the procedure of Example 1 (Part C) to yield the corresponding free hydroxyl under Column IX.

(VIII)

methyl 3-[1-(1-tetrahydropyran-2'-yloxy)ethyl]-8,8,13,13-tetramethyltetradec-2-enoate,
methyl 3-[1-(1-tetrahydropyran-2'-yloxy)ethyl]-7,10,10-trimethylundec-2-enoate,
methyl 3-[1-(1-tetrahydropyran-2'-yloxy)ethyl]-7,11,11-trimethyldodec-2-enoate,
methyl 3-[1-(1-tetrahydropyran-2'-yloxy)ethyl]-7,10,10-trimethyldodec-2-enoate,
methyl 3-[1-(1-tetrahydropyran-2'-yloxy)ethyl]-7-ethyl-10,10-dimethyldodec-2-enoate,
methyl 3-[1-(1-tetrahydropyran-2'-yloxy)ethyl]-7,11,11-trimethyltridec-2-enoate,
methyl 3-[1-(1-tetrahydropyran-2'-yloxy)ethyl]-5,9,9-trimethyldec-2-enoate.

(IX)

methyl 3-[1-(1-hydroxy)ethyl]-8,8,13,13-tetramethyltetradec-2-enoate,
methyl 3-[1-(1-hydroxy)ethyl]-7,10,10-trimethylundec-2-enoate,
methyl 3-[1-(1-hydroxy)ethyl]-7,11,11-trimethyldodec-2-enoate,
methyl 3-[1-(1-hydroxy)ethyl]-7,10,10-trimethydodec-2-enoate,
methyl 3-[-(1-hydroxy)ethyl]-7-ethyl-10,10-dimethyldodec-2-enoate,
methyl 3-[1-(1-hydroxy)ethyl]-7,11,11-trimethyltridec-2-enoate,
methyl 3-[1-(1-hydroxy)ethyl]-5,9,9-trimethyldec-2-enoate.

(B) Each of the ketones under Column VII are treated according to the process of Example 2 (Part A) to yield the amides under Column XI which are hydrolyzed using the process of Example 1 (Part C) to yield the free hydroxyl under Column XII.

(XI)

3-[1-(1-tetrahydropyran-2'-yloxy)ethyl]-8,8,13,13-tetramethyltetradec-2-enamide,
3-[1-(1-tetrahydropyran-2'-yloxy)ethyl]-7,10,10-trimethylundec-2-enamide,
3-[1-(1-tetrahydropyran-2'-yloxy)ethyl-7,11,11-trimethyldodec-2-enamide,
3-[1-(1-tetrahydropyran-2'-yloxy)ethyl]-7,10,10-trimethyldodec-2-enamide,
3-[1-(1-tetrahydropyran-2'-yloxy)ethyl]-7-ethyl-10,10-dimethyldodec-2-enamide,
3-[1-(1-tetrahydropyran-2'-yloxy)ethyl]-7,11,11-trimethyltridec-2-enamide,
3-[1-(1-tetrahydropyran-2'-yloxy)ethyl]-5,9,9-trimethyldec-2-enamide.

(XII)

3-[1-(1-hydroxy)ethyl]-8,8,13,13-tetramethyltetradec-2-enamide,
3-[1-(1-hydroxy)ethyl-7,10,10-trimethylundec-2-enamide,
3-[1-(1-hydroxy)ethyl]-7,11,11-trimethyldodec-2-enamide,
3-[1-(1-hydroxy)ethyl]-7,10,10-trimethyldodec-2-enamide,
3-[1-(1-hydroxy)ethyl]-7-ethyl-10,10-dimethyldodec-2-enamide,
3-[1-(1-hydroxy)ethyl]-7,11,11-trimethyltridec-2-enamide,
3-[1-(1-hydroxy)ethyl]-5,9,9-trimethyldec-2-enamide.

EXAMPLE 6

Using the process of Example 1 (Part A), 2-(tetrahydropyran-2'-yloxy)-n-butyronitrile is reacted with Grignard of 1 - bromo-4,4,8,8-tetramethylnonane to yield 3-(tetrahydropyran - 2'-yloxy) - 8,8,12,12 - tetramethyltridecan-4-one which is reacted with diethylcarbomethoxymethylphosphonate to yield methyl 3 - [1-(1-tetrahydropyran - 2'-yloxy)-n-propyl]-7,7,11,11-tetramethyldodec-2-enoate. The methyl ester is hydrolyzed using the procedure of Example 1 (Part C) to afford methyl 3-[1-(1-hydroxy)n-propyl] - 7,7,11,11-tetramethyldodec-3-enoate.

By repeating the procedure of this example using 2-(tetrahydropyran-2'-yloxy)acetonitrile in place of the butyronitrile, there is obtained as the final product, methyl 3 - hydroxymethyl - 7,7,11,11-tetramethyldodec-2-enoate (IV; R¹ is hydrogen, R⁷ is methyl, R⁸' is hydrogen).

The ketone, 3 - (tetrahydropyran-2'-yloxy)-8,8,12,12-tetramethyltridecan-4-one is converted into 3-[1-(1-tetrahydropyran - 2'-yloxy)n-propyl]-7,7,11,11-tetramethyldodec-2-enamide using the process of Example 2 (Part A) which is converted into 3-[1-(1-hydroxy)n-propyl)-7,7,11,11-tetramethyldodec-2-enamide by the process of Example 1 (Part C).

EXAMPLE 7

The process of Example 2 (Part A) is repeated with the exception of using each of N-methyl diethoxyphosphonoacetamide and N-ethyl diethoxyphosphonoacetamide in place of diethoxyphosphonoacetamide to yield N-methyl 3 - [1-(1-tetrahydropyran-2'-yloxy)ethyl]-7-ethyl-7,10,10-trimethylundec - 2-enamide and N-ethyl 3-[1-(1-tetrahydropyran-2'-yloxy)ethyl]-7-ethyl-7,10,10-trimethylundec-2-enamide. The thus-obtained N-methyl amide and N-ethyl amide are hydrolyzed using the process of Example 1 (Part C) to afford N-methyl 3-[1-(1-hydroxy)ethyl]-7-ethyl-7,10,10 - trimethylundec-2-enamide and N-ethyl 3-[1 - (1-hydroxy)ethyl]-7-ethyl-7,10,10-trimethylundec-2-enamide.

Similarly, other ketones of Formula III, such as those listed under Columns I and VII, can be reacted with phosphonoacetamides such as N-methyl diethoxyphosphonoacetamide and N-ethyl diethoxyphosphonoacetamide to obtain the corresponding 2-enamide of Formula V which is then hydrolyzed according to the process of Example 1 (Part C) to afford the corresponding free hydroxy-containing amide of Formula V (R⁸' being hydrogen).

EXAMPLE 8

N-methyl diethoxyphosphonoacetamide, N-ethyl diethoxyphosphonoacetamide and N-(n-propyl) diethoxyphosphonoacetamide is reacted with 3 - (tetrahydropyran-2'-yloxy)-8,8,12,12-tetramethyltridecan-4-one using the process of Example 2 (Part A) to yield N-methyl 3-[1-(1-tetrahydropyran - 2' - yloxy) - n - propyl]-7,7,11,11-tetramethyldodec - 2 - enamide, N-ethyl 3 - [1-(1-tetrahydropyran - 2' - yloxy)n-propyl] - 7,7,11,11-tetramethyldodec-2-enamide and N-(n-propyl) 3-[1-tetrahydropyran-2'-yloxy)n-propyl] - 7,7,11,11 - tetramethyldodec-2-enamide, respectively.

Each of the thus-obtained amides is hydrolyzed using the process of Example 1 (Part C) to yield the corresponding free hydroxy-containing amide, that is, N-methyl 3-[1-(1-hydroxy)n-propyl]7,7,11,11-tetramethyldodec - 2 - enamide, N-ethyl 3-[1-(1-hydroxy)n-propyl] - 7,7,11,11-tetramethyldodec-2-enamide and N-(n-propyl) 3-[1-(1-hydroxy)n-propyl]-7,7,11,11-tetramethyldodec - 2 - enamide, respectively.

EXAMPLE 9

Compositions according to the present invention which are suitable for spraying on the locus of the insects, preferably during egg or larvae stage, or on granular inert carriers, are as follows. Parts by weight.

|  | Parts |
|---|---|
| Methyl 3[1-(1-hydroxy)ethyl]-7-ethyl - 7,10,10 - trimethylundec-2-enoate | 5 |
| Cottonseed oil | 95 |
| Methyl 3-hydroxymethyl-7,7,11,11-tetramethyldodec-2-enoate | 3 |
| Sesame oil | 97 |
| N-ethyl 3-[1-(1-hydroxyn)-propyl] - 7,7,11,11 - tetramethyldodec-2-enamide | 5 |
| Xylene | 95 |

EXAMPLE 10

A mixture of 45 g. of sodium cyanide, 110 ml. of water and 80 g. of n-butyraldehyde is stirred vigorously at 10–20° while 200 ml. of 40% sulfuric acid is added over three hours maintaining temperature of 10–20°. After addition is complete, the mixture is stirred for 15 minutes, allowed to stand and organic layer decanted off. Aqueous layer is extracted with ether and ether extracts combined with organic layer decanted. Solvent is evaporated to yield 2-hydroxy n-butyronitrile which is purified by distillation under reduced pressure.

A mixture of 8.5 g. of 2-hydroxy n-butyronitrile and 8.4 g. of freshly distilled dihydropyran is stirred in the presence of a trace of hydrogen chloride for about four hours, the process of the reaction being followed by thin layer chromatography. Upon completion of the reaction, the mixture is distilled under reduced pressure in the presence of anhydrous potassium carbonate to yield 2-(tetrahydropyran-2'-yloxy)-n-butyronitrile.

By the foregoing procedure, other aldehydes of the formula $R^1$—CHO can be converted into the nitriles of Formula II. Similarly, through the use of dihydrofuran in place of dihydropyran in the above procedure, the corresponding tetrahydrofuran-2'-yl ethers are prepared.

EXAMPLE 11

The process of Example 1 (Part A) is repeated using 2-(tetrahydropyran-2'-yloxy)acetonitrile in place of 2-(tetrahydropyran-2'-yloxy)propionitrile to yield 1-(tetrahydropyran-2'-yloxy)-6-ethyl-6,9,9-trimethyldecan-2 - one which is reacted with diethylcarbethoxymethylphosphonate using the procedure of Example 1 (Part B) to yield ethyl 3-[1-(tetrahydropyran-2'-yloxy)methyl]-7-ethyl - 7,10,10-trimethylundec-2-enoate which upon acid hydrolysis (Example 1, Part C) affords ethyl 3-hydroxymethyl - 7-ethyl-7,10,10-trimethylundec-2-enoate.

EXAMPLE 12

By use of the process of Example 1 (Part A), each of the C-1 bromides of Example 3 (Part A) is converted into the Grignard and then reacted with 2-(tetrahydropyran-2'-yloxy)acetonitrile to yield the respective ketones listed in Column XIII.

(XIII)

1-(tetrahydropyran-2'-yloxy)-6,6,10,10-tetramethylundecan-2-one,
1-(tetrahydropyran-2'-yloxy)-5,5,9,9-tetramethyldecan-2-one,
1-(tetrahydropyran-2'-yloxy)-6,6,9,9-tetramethyldecan-2-one,
1-(tetrahyrropyran-2'-yloxy)-6,6,10,10-tetramethyldodecan-2-one,
1-(tetrahydropyran-2'-yloxy)-6,6,10,10-tetramethyldoundecan-2-one,
1-(tetrahydropyran-2'-yloxy)-6,9-diethyl-6,9-dimethylundecan-2-one,
1-(tetrahydropyran-2'-yloxy)-6,6,9,9-tetramethylundecan-2-one and
1-(tetrahydropyran-2'-yloxy)-6,6,11,11-tetramethyldodecan-2-one.

Each of the ketones listed in Column XIII is reacted with diethylcarbethoxymethylphosphonate using the procedure of Example 1 (Part B) to yield the ethyl esters listed in Column XIV.

(XIV)

ethyl 3-[1-tetrahydropyran-2'-yloxy)methyl]-7,7,11,11-tetramethyldodec-2-enoate,
ethyl 3-[1-(tetrahydropyran-2'-yloxy)methyl]-6,6,10,10-tetramethylundec-2-enoate,
ethyl 3-[1-tetrahydropyran-2'-yloxy)methyl]-7,7,10,10-tetramethylundec-2-enoate,
ethyl 3-[1-(tetrahydropyran-2'-yloxy)methyl]-7,7,11,11-tetramethyltridec-2-enoate,
ethyl 3[1-(tetrahydropyran-2'-yloxy)methyl]-7-ethyl-7,10,10-trimethyldodec-2-enoate,
ethyl 3-[1-(tetrahydropyran-2'-yloxy)methyl]-7,10-dimethyl-7,10-dimethyldodec-2-enoate,
ethyl 3-[1-(tetrahydropyran-2'-yloxy)methyl]-7,7,10,10-tetramethyldodec-2-enoate and
ethyl 3-[1-(tetrahydropyran-2'-yloxy)methyl]-7,7,12,12-tetramethyltridec-2-enoate.

Each of the compounds listed in Column XIV is acid hydrolyzed using the process of Example 1 (Part C) to yield the compounds listed in Column XV.

(XV)

ethyl 3-hydroxymethyl-7,7,11,11-tetramethyldodec-2-enoate,
ethyl 3-hydroxymethyl-6,6,10,10-tetramethylundec-2-enoate,
ethyl 3-hydroxymethyl-7,7,10,10-tetramethylundec-2-enoate,
ethyl 3-hydroxymethyl-7,7,11,11-tetramethyltridec-2-enoate,
ethyl 3-hydroxymethyl-7-ethyl-7,10,10-trimethyldodec-2-enoate,
ethyl 3-hydroxymethyl-7,10-diethyl-7,10-dimethyldodec-2-enoate,
ethyl 3-hydroxymethyl-7,7,10,10-tetramethyldodec-2-enoate and
ethyl 3-hydroxymethyl-7,7,12,12-tetramethyltridec-2-enoate.

EXAMPLE 13

Each of the ketones listed in Column XIII is reacted with N,N-diethyl diethoxyphosphoacetamide using the procedure of Example 2 (Part A) to yield the compounds listed in Column XVI, each of which is hydrolyzed using the procedure of Example 1 (Part C) to yield the compounds listed in Column XVII.

(XVI)

N,N-diethyl 3-[1-(tetrahydropyran-2'-yloxy)methyl] 7,7,11,11-tetramethyldodec-2-enamide,
N,N-diethyl 3-[1-(tetrahydropyran-2'-yloxy)methyl] 6,6,10,10-tetramethylundec-2-enamide,
N,N-diethyl 3-[1-(tetrahydropyran-2'-yloxy)methyl] 7,7,10,10-tetramethylundec-2-enamide,
N,N-diethyl 3-[1-(tetrahydropyran-2'-yloxy)methyl] 7,7,11,11-tetramethyltridec-2-enamide,
N,N-diethyl 3-[1-(tetrahydropyran-2'-yloxy)methyl] 7-ethyl-7,10,10-trimethyldodec-2-enamide,
N,N-diethyl 3-[1-(tetrahydropyran-2'-yloxy)methyl] 7,10-diethyl-7,10-dimethyldodec-2-enamide,
N,N-diethyl 3-[1-(tetrahydropyran-2'-yloxy)methyl] 7,7,10,10-tetramethyldodec-2-enamide and
N,N-diethyl 3-[1-(tetrahydropyran-2'-yloxy)methyl] 7,7,12,12-tetramethyltridec-2-enamide.

(XVII)

N,N-diethyl 3-hydroxymethyl-7,7,11,11-tetramethyldodec-2-enamide,
N,N-diethyl 3-hydroxymethyl-6,6,10,10-tetramethylundec-2-enamide, N,N-diethyl 3-hydroxymethyl-7,7,10,10-tetramethyl-
undec-2-enamide,
N,N-diethyl 3-hydroxymethyl-7,7,11,11-tetramethyl-
tridec-2-enamide,
N,N-diethyl 3-hydroxymethyl-7-ethyl-7,10,10-
trimethyldodec-2-enamide,
N,N-diethyl 3-hydroxymethyl-7,10-dimethyl-7,10-
dimethyldodec-2-enamide,
N,N-diethyl 3-hydroxymethyl-7,7,10,10-tetramethyl-
dodec-2-enamide and
N,N-diethyl 3-hydroxymethyl-7,7,12,12-tetramethyl-
tridec-2-enamide.

EXAMPLE 14

A mixture of 1 g. of ethyl 3-hydroxymethyl-7-ethyl-7,10,10-trimethylundec-2-enoate, 60 ml. of methanol, 0.2 g. of sodium carbonate and 6 ml. of water is stirred at about 30° for three hours. The mixture is diluted with water, neutralized and then extracted with ether. The organic extracts are combined, washed with water, dried over sodium sulfate and evaporated to yield 3-hydroxymethyl-7-ethyl-7,10,10-trimethylundec - 2 - enoic acid.

Using the above procedure, the other acid esters of the present invention can be converted into the free acid.

EXAMPLE 15

To a solution of 0.5 g. of 3-hydroxymethyl-7-ethyl-7,10,10-trimethylundec-2-enoic acid in 15 ml. of benzene, there is added with stirring one molar equivalent of potassium bicarbonate. The mixture is stirred until the evolution of carbon dioxide ceases and then the mixture is evaporated to yield potassium 3-hydroxymethyl-7-ethyl-7,10,10-trimethylundec-2-enoate which can be purified by silica chromatography.

Alternatively, acid salts can be prepared by titrating the acid with an organic solution of the metal base, e.g. methanolic solution of sodium methoxide.

EXAMPLE 16

A mixture of methyl 3-[1-(1-tetrahydropyran-2'-yloxy)ethyl] - 7 - ethyl-7,10,10-trimethylundec-2-enoate (2 g.), 2.4 g. of benzyl alcohol, 0.1 g. of aluminum ethoxide and 0.2 g. of p-phenyldiamine is heated to 120° under nitrogen for eight hours. The methanol liberated by the reaction is removed by distillation. The residual reaction mixture is diluted with ether, the ethereal phase is separate, washed with water and evaporated to yield benzyl 3-[1-(1-tetrahydropyran - 2' - yloxy)ethyl] - 7 - ethyl-7,10,10-trimethylundec-2-enoate which is hydrolyzed using the procedure of Example 1 (Part C) to yield benzyl 3 - [1-(1-hydroxy)ethyl]-7-ethyl-7,10,10-trimethylundec-2-enoate.

By using other alcohols in the above procedure in place of benzyl alcohol, the corresponding esters are obtained.

Alternatively, acid esters can be prepared from the acid halide, e.g. acid chloride by treating the free acid with thionyl chloride and converting the acid chloride to the ester by reaction with an alcohol for producing the ester desired.

EXAMPLE 17

(A) To a 15% solution of butyl lithium in hexane (420 ml.) is added at −10° with stirring, a solution of dry diethylamine (49 g.) in anhydrous ether (530 ml.). The mixture is then stirred for one hour at 20° to provide a one molar solution of diethylamino lithium.

An aliquot (50 ml.) of the thus-prepared solution is added to ethyl 3-hydroxymethyl-7,7,11,11-tetramethyl-dodec-2-enoate (12 g.) in ether (75 ml.) and the reaction mixture stirred for four hours at room temperature. The mixture is washed with aqueous 0.1 N hydrochloric acid solution and water, dried over sodium sulfate and evaporated to dryness to yield N,N-diethyl 3-hydroxymethyl-7,7,11,11-tetramethyldodec-2-enamide.

(B) Other amides can be prepared using the procedure of Part A by replacing diethylamine with an equivalent amount of amines, such as dimethylamine, aniline, diphenylamine, pyrrolidine, piperidine, morpholine, piperazine, 4-methylpiperazine, 2-methoxyethylamine, ethylamine and ammonia. Similarly, other ethers of the present invention can be used in the foregoing procedure.

EXAMPLE 18

The Grignard of the C-1 halides listed in Column VI is reacted with 2-(tetrahydropyran-2'-yloxy)acetonitrile using the process of Example 1 (Part A) to yield the ketones listed in Column XVIII.

(XVIII)

1-(tetrahydropyran-2'-yloxy)-7,7,12,12-tetramethyl-tridecan-2-one,
1-(tetrahydropyran-2'-yloxy)-6,9,9-trimethyldecan-2-one,
1-(tetrahydropyran-2'-yloxy)-6,10,10-trimethylundecan-2-one,
1-(tetrahydropyran-2'-yloxy)-6,9,9-trimethylundecan-2-one,
1-(tetrahydropyran-2'-yloxy)-6-ethyl-9,9-dimethyl-undecan-2-one,
1-(tetrahydropyran-2'-yloxy)-6,10,10-trimethyldodecan-2-one and
1-(tetrahydropyran-2'-yloxy)-4,8,8-trimethylnonan-2-one.

Each of the ketones listed in Column XVIII is reacted with diethylcarbethoxymethylphosphonate using the procedure of Example 1 (Part B) to yield the ethyl esters listed in Column XIX which are hydrolyzed using the procedure of Example 1 (Part C) to yield the compounds listed in Column XX.

(XIX)

ethyl 3-[1-(tetrahydropyran-2'-yloxy)methyl] 8,8,13,13-tetramethyltetradec-2-enoate,
ethyl 3-[1-(tetrahydropyran-2'-yloxy)methyl] 7,10,10-trimethylundec-2-enoate,
ethyl 3-[1-(tetrahydropyran-2'-yloxy)methyl] 7,11,11-trimethyldodec-2-enoate,
ethyl 3-[1-(tetrahydropyran-2'-yloxy)methyl] 7,10,10-trimethyldodec-2-enoate,
ethyl 3-[1-(tetrahydropyran-2'-yloxy)methyl]- 7-ethyl-10,10-dimethyldodec-2-enoate,
ethyl 3-[1-(tetrahydropyran-2'-yloxy)methyl]- 7,11,11-trimethyltridec-2-enoate and
ethyl 3-[1-(tetrahydropyran-2'-yloxy)methyl]- 5,9,9-trimethyldec-2-enoate.

(XX)

ethyl 3-hydroxymethyl-8,8,13,13-tetramethyltetradec-2-enoate,
ethyl 3-hydroxymethyl-7,10,10-trimethylundec-2-enoate,
ethyl 3-hydroxymethyl-7,11,11-trimethyldodec-2-enoate,
ethyl 3-hydroxymethyl-7,10,10-trimethyldodec-2-enoate,
ethyl 3-hydroxymethyl-7-ethyl-10,10-dimethyldodec-2-enoate,
ethyl 3-hydroxymethyl-7,11,11-trimethyltridec-2-enoate and
ethyl 3-hydroxymethyl-5,9,9-trimethyldec-2-enoate.

EXAMPLE 19

Each of the ketones listed in Column XVIII is reacted with N,N-diethyl diethoxyphosphonoacetamide using the procedure of Example 2 (Part A) to yield the compounds listed in Column XXI which are hydrolyzed using the procedure of Example 1 (Part C) to yield the compounds listed in Column XXII.

(XXI)

N,N-diethyl 3-[1-(tetrahydropyran-2'-yloxy)methyl] 8,8,13,13-tetramethyltetradec-2-enamide,
N,N-diethyl 3-[1-(tetrahydropyran-2'-yloxy)methyl] 7,10,10-trimethylundec-2-enamide, N,N-diethyl 3-[1-(tetrahydropyran-2'-yloxy)methyl] 7,11,11-trimethyldodec-2-enamide,
N,N-diethyl 3-[1-(tetrahydropyran-2'-yloxy)methyl] 7,10,10-trimethyldodec-2-enamide,
N,N-diethyl 3-[1-(tetrahydropyran-2'-yloxy)methyl] 7-ethyl-10,10-dimethyldodec-2-enamide,
N,N-diethyl 3-[1-(tetrahydropyran-2'-yloxy)methyl] 7,11,11-trimethyltridec-2-enamide and
N,N-diethyl 3-[1-(tetrahydropyran-2'-yloxy)methyl] 5,9,9-trimethyldec-2-enamide.

(XXII)

N,N-diethyl 3-hydroxymethyl-8,8,13,13-tetramethyl-tetradec-2-enamide,
N,N-diethyl 3-hydroxymethyl-7,10,10-trimethylundec-2-enamide,
N,N-diethyl 3-hydroxymethyl-7,11,11-trimethyldodec-2-enamide,
N,N-diethyl 3-hydroxymethyl-7,10,10-trimethyldodec-2-enamide,
N,N-diethyl 3-hydroxymethyl-7-ethyl-10,10-dimethyl-dodec-2-enamide,
N,N-diethyl 3-hydroxymethyl-7,11,11-trimethyltridec-2-enamide and
N,N-diethyl 3-hydroxymethyl-5,9,9-trimethyldec-2-enamide.

What is claimed is:

1. A compound selected from those having the formula A:

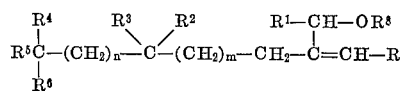

(A)

wherein,
$m$ is the positive integer one to five;
$n$ is the positive integer two to six;
R is the —COOR$^7$;
R$^1$ is hydrogen or lower alkyl;
R$^2$ is hydrogen or lower alkyl;
each of R$^3$, R$^4$, R$^5$ and R$^6$ is lower alkyl;
R$^7$ is hydrogen, lower alkyl, cycloalkyl, aralkyl or metal;
R$^8$ is hydrogen, tetrahydropyran-2'-yl or tetrahydrofuran-2'-yl.

2. A compound according to claim 1 in which $m$ is one to three and $n$ is one to four.

3. A compound according to claim 2 in which each of R$^1$ and R$^2$ and hydrogen, methyl or ethyl and each of R$^3$, R$^4$, R$^5$ and R$^6$ is methyl or ethyl.

4. A compound according to claim 1 in which $m$ is one or two and $n$ is two or four.

5. A compound according to claim 4 in which each of R$^1$ and R$^2$ is hydrogen, methyl or ethyl and each of R$^3$, R$^4$, R$^5$ and R$^6$ is methyl or ethyl.

6. A compound according to claim 5 in which R$^1$ is methyl or hydrogen.

7. Ethyl 3 - hydroxymethyl-7,10,10-trimethyldodec-2-enoate.

References Cited

UNITED STATES PATENTS 2,287,107 6/1942 Karrer _____ 260—413
2,928,854 3/1960 Bolhofer _____ 260—413

LEWIS GOTTS, Primary Examiner

D. G. RIVERS, Assistant Examiner

U.S. Cl. X.R.

260—247.7 H, 268 C, 294.7 E, 326.5 E, 345.8, 345.9, 347.4, 347.8, 404, 410, 410.5 413, 465.6, 652 R; 424—248, 250, 267, 274, 283, 285, 312, 318, 320